United States Patent
Wang

(10) Patent No.: US 10,663,602 B2
(45) Date of Patent: May 26, 2020

(54) METHOD IN COMMUNICATION DEVICE FOR PROVIDING LOCATION INFORMATION IN WIRELESS COMMUNICATION ENVIRONMENT

(71) Applicant: GUANGDONG OPPO MOBILE TELECOMMUNICATIONS CORP., LTD., Dongguan (CN)

(72) Inventor: Xiaohui Wang, Limhamn (SE)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 482 days.

(21) Appl. No.: 15/510,595

(22) PCT Filed: Sep. 24, 2014

(86) PCT No.: PCT/EP2014/070369
§ 371 (c)(1),
(2) Date: Mar. 10, 2017

(87) PCT Pub. No.: WO2016/045723
PCT Pub. Date: Mar. 31, 2016

(65) Prior Publication Data
US 2017/0285180 A1    Oct. 5, 2017

(51) Int. Cl.
*G01S 19/48* (2010.01)
*G01S 5/02* (2010.01)
(Continued)

(52) U.S. Cl.
CPC ............... *G01S 19/48* (2013.01); *G01S 5/02* (2013.01); *G01S 19/12* (2013.01); *G01S 19/14* (2013.01);
(Continued)

(58) Field of Classification Search
None
See application file for complete search history.

(56) References Cited

U.S. PATENT DOCUMENTS

| | | | |
|---|---|---|---|
| 2012/0173257 A1* | 7/2012 | Preiss | G06Q 10/06 705/2 |
| 2013/0190009 A1* | 7/2013 | Johansson | H04W 64/003 455/456.1 |
| 2013/0310068 A1* | 11/2013 | Fischer | G01S 19/05 455/456.1 |

FOREIGN PATENT DOCUMENTS

EP        2579640 A1    4/2013

OTHER PUBLICATIONS

PCT International Search Report, dated May 26, 2015, in connection with International Application No. PCT/EP2014/070369, all pages.

(Continued)

*Primary Examiner* — Whitney Moore
(74) *Attorney, Agent, or Firm* — Finnegan, Henderson, Farabow, Garrett & Dunner, LLP

(57) ABSTRACT

A method in a communication device for providing a location information of the communication device to a Minimization of Driving Tests, MDT, server is disclosed. The communication device operates in a wireless communication environment which comprises multiple networks comprising at least one cellular network and at least one satellite positioning system. The communication device starts an MDT measurement and determines a signal strength received from a satellite in the satellite positioning system by measuring the signal strength at a positioning antenna. When the signal strength received from the satellite is above a threshold, the communication device 110 determines a feasibility of an Assisted Global Position System, AGPS. When the AGPS is feasible, the communication (Continued)

device initiates an AGPS session for obtaining the location information using an acquisition assistance data and sends the location information together with other MDT data to the MDT server.

15 Claims, 4 Drawing Sheets

(51) Int. Cl.
  *H04W 64/00* (2009.01)
  *G01S 19/14* (2010.01)
  *G01S 19/12* (2010.01)
  *H04W 24/10* (2009.01)

(52) U.S. Cl.
  CPC ........... *H04W 24/10* (2013.01); *H04W 64/00* (2013.01); *H04W 64/003* (2013.01)

(56) References Cited

OTHER PUBLICATIONS

PCT Written Opinion, dated May 26, 2015, in connection with International Application No. PCT/EP2014/070369, all pages.
GPS World Staff: GNSS Test Standards for Cellular Location, Internet Article, May 1, 2013, 14 pages.

* cited by examiner

METHOD IN COMMUNICATION DEVICE FOR PROVIDING LOCATION INFORMATION IN WIRELESS COMMUNICATION ENVIRONMENT

TECHNICAL FIELD

Embodiments herein relate to a method in a communication device. In particular, they relate to a method in a communication device for providing a location information of the communication device to a Minimization of Drive Tests, MDT, server in a wireless communication environment.

BACKGROUND

Communication devices such as User Equipments (UE) are also known as e.g. wireless terminals, mobile terminals and/or mobile stations. Communication devices are enabled to communicate or operate wirelessly in a Heterogeneous wireless communication environment comprising multiple networks or Heterogeneous Networks (HetNet) with access nodes, such as a cellular communications network which comprising Second/Third Generation (2G/3G) network, 3G Long Term Evolution (LTE) network, Worldwide interoperability for Microwave Access (WiMAX) network, etc., a satellite positioning system which comprising e.g. Global Positioning System, GPS, Global Navigation Satellite System, GLONASS, and Galileo Position System and a wireless local network, such as a Wireless Local Area Network (WLAN).

Communication devices may further be referred to as mobile telephones, cellular telephones, smart phones, laptops, tablet computers or phablets with wireless capability, just to mention some further examples. The communication device in the present context may be, for example, portable, pocket-storable, hand-held, computer-comprised, or vehicle-mounted mobile devices, enabled to communicate voice and/or data via an access node with another entity, such as another communication device or a server in the wireless communication environment.

Nowadays, almost all communication devices are equipped with a wireless local network unit, such as a WLAN unit and/or a stand-alone GPS unit. The wireless local network unit provides a connection for a communication device through an access point to the Internet with high bandwidth and low cost. The stand-alone GPS unit provides position information for a communication device with high accuracy by communicating with a satellite.

At present, optimisation of a network is generally done by drive tests. In the drive tests, an equipment (test mobile) collects all required information, e.g. radio measurements and location information etc. while the equipment is being driven in a car on the roads. This information is used offline by the network to analyse the coverage in different locations and based on the analysis, operation parameters, power, antenna locations, antenna tilts, etc. are optimised. Recently the Minimization of Drive Tests, MDT is introduced in the third Generation Partnership Project (3GPP) standardization Release-10 to minimize the cost of the traditional drive tests. The MDT enables network operators to utilize users' equipment to collect radio measurements and associated location information, in order to assess network performance while reducing the Operation and Expenditure (OPEX) associated with the traditional drive tests. When an MDT is implemented in a communication device, an MDT procedure in the communication device will be activated by a network to perform measurements. The MDT procedure may be done periodically or triggered by an event, typically when a received radio signal quality of a serving cell in the network is worse than a pre-defined threshold. The measurement report may be sent back immediately to the network as part of a Radio Resource Management (RRM) procedure, or logged in the communication device's memory and reported to the network when requested by the network.

One crucial part of the MDT as comparing to a normal measurements report is the location information. Because network operators have to know where to add more basestations or access nodes to optimize cells coverage and improve cell relations based on the MDT report. Since users of a communication devices don't want to have their standalone GPS unit always on for assisting network operators to evaluate the network performance, or the GPS unit may not work properly, e.g. in shadowed areas, the availability and accuracy of a location information associated with the measurements report can be problematic. However, the location information is the most valuable data in the MDT report for network operators to find problems such as coverage holes or erroneous cell relations etc. to improve their services.

US2013190009 discloses a method for location option control for MDT. The UE determines the best positioning procedure from a list of available location options. Each location option is associated with a priority. The prioritization may be based on signal strength and/or quality of a cell and WiFi signals. However, the method has very complicated structure, e.g. with many trees and branches for selecting location options, so it is not a solution with efficiency or accuracy.

SUMMARY

Therefore it is an object of embodiments herein to provide an improved method for performing MDT in a wireless environment.

According to a first aspect of embodiments herein, the object is achieved by a method in a communication device for providing a location information of the communication device to a Minimization of Driving Tests, MDT, server. The communication device operates in a wireless communication environment, where the wireless communication environment comprises multiple networks comprising at least one cellular network and at least one satellite positioning system. When an MDT measurement is started or triggered in the communication device, the communication device determines a signal strength received from a satellite in a satellite positioning system by measuring the signal strength at a positioning antenna. When the signal strength received from the satellite is above a threshold, the communication device determines a feasibility of an Assisted Global Position System, AGPS. When the AGPS is feasible, the communication device initiates an AGPS session for obtaining the location information using acquisition assistance data; and then sends the location information together with other MDT data to the MDT server.

According to a second aspect of embodiments herein, the object is achieved by a communication device for providing a location information of the communication device to a Minimization of Driving Tests, MDT, server. The communication device operates in a wireless communication environment, where the wireless communication environment comprises multiple networks comprising at least one cellular network and at least one satellite positioning system. When an MDT measurement is started or triggered in the communication device, the communication device is configured to determine a signal strength received from a satellite in a satellite positioning system by measuring the signal strength at a positioning antenna. The communication device further is configured to determine a feasibility of an Assisted Global Position System, AGPS, when the signal strength received from the satellite is above a threshold. The communication device is further configured to initiate an AGPS session for obtaining the location information using an acquisition assistance data when the AGPS is feasible; and to send the location information together with other MDT data to the MDT server.

According to embodiments herein, when an MDT measurement is started or triggered in the communication device, the communication device first checks whether a signal strength received from a satellite in a satellite positioning system is good enough. When the signal strength received from the satellite is above a threshold, the communication device checks if an AGPS is feasible. If the AGPS is available, the communication device uses the AGPS for obtaining a location information of the communication device. The AGPS is much faster and less sensitive to bad radio propagating conditions than a stand-alone GPS unit for obtaining the location information of the communication device. In this way, a quick, accurate and efficient solution is provided for obtaining the location information of the communication device at a right time. Further, checking the signal strength received from the satellite is done by measuring the signal strength at a positioning antenna without involving modules and functions in the stand-alone GPS unit.

Since the importance of the signal strength from the satellites as well as the advantages of the AGPS are taken into account and utilized in the method and communication device according to embodiments herein, the procedure to choose different options for obtaining the location information is simple and straightforward without many trees and branches, and is easy to be implemented. This will significantly improve the MDT efficiency with minimal impacts on the power or processing consumption of the communication device.

Thus, embodiments herein provide an improved method for performing MDT in a wireless communication environment.

BRIEF DESCRIPTION OF THE DRAWINGS

Examples of embodiments herein are described in more detail with reference to attached drawings in which.

DETAILED DESCRIPTION

Figure 1:
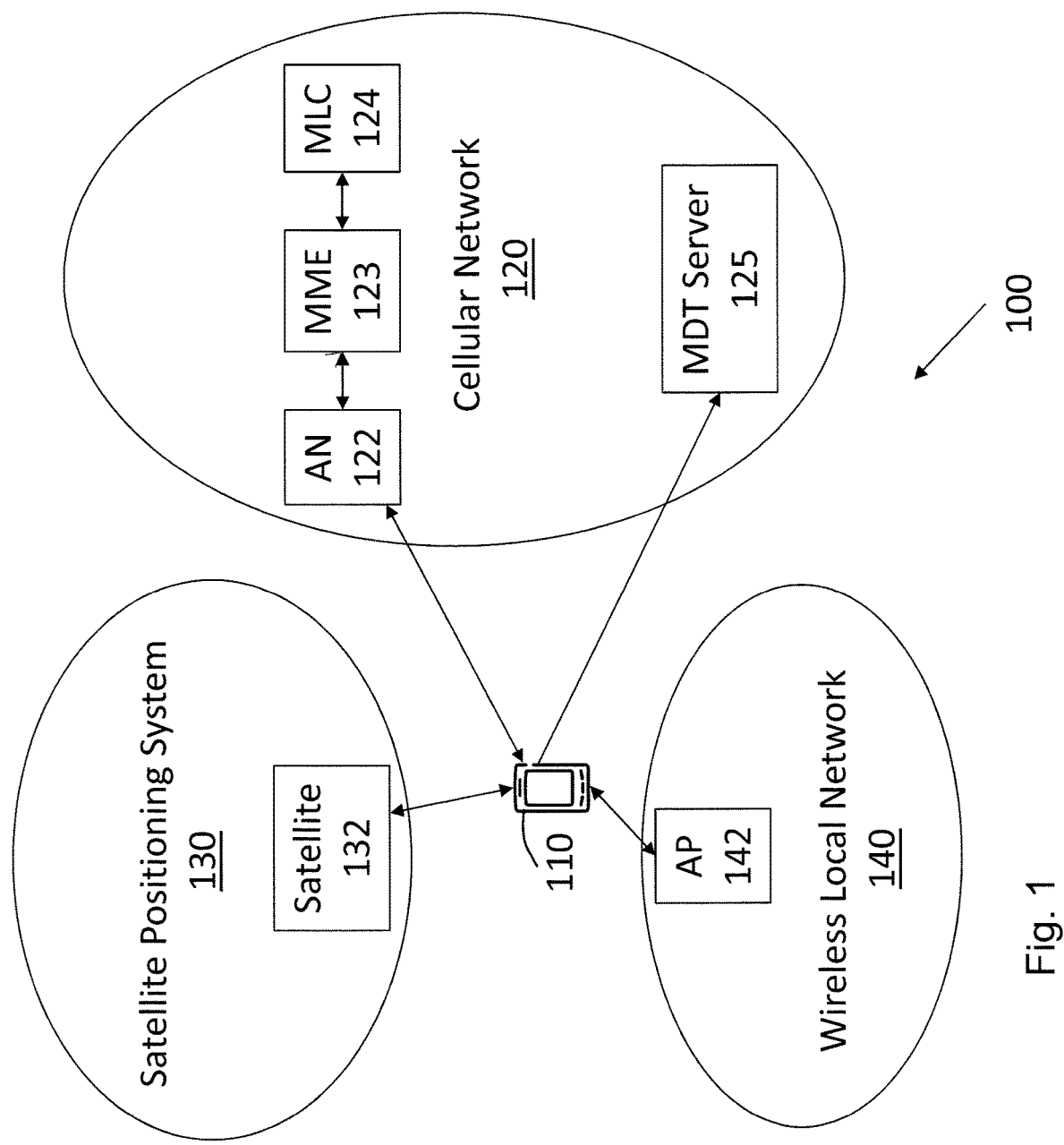
FIG. 1 is a schematic block diagram illustrating an example of a wireless communication environment.

FIG. 1 depicts an example of a wireless communication environment 100 in which embodiments herein may be implemented. The wireless communication environment 100 comprises one or more wireless communication networks such as e.g. a HetNet comprising LTE, Wideband Code Division Multiple Access (WCDMA), GSM networks, any 3GPP cellular network, Wimax, WLAN, GPS or any cellular network or system or an IP network such as the Internet.

A number of wireless communication devices operate in the wireless communication environment 100, whereof one, a communication device 110, is shown in FIG. 1. The communication device 110 may, e.g. be a mobile terminal or station or a wireless terminal, a mobile phone, a computer such as e.g. a laptop, a Personal Digital Assistants (PDAs) or a tablet computer, with wireless capability, or any other radio network units capable to communicate over a radio link in a wireless communications network. Please note the term communication device used in this document also covers other wireless devices such as Machine to machine (M2M) devices.

The wireless communications environment 100 comprises a plurality of networks whereof three, a cellular network 120, a satellite positioning system 130 and a wireless local network 140 are depicted in FIG. 1. The cellular network 120 comprises at least one Access Node, AN 122, which may be an eNB, an eNodeB, or a Home Node B, and Home eNode B or any other network node capable to serve a user equipment or a machine type communication device in a wireless communications network. The cellular network 120 may further comprise other modules or units which enable communications between the communication device 110 and the cellular network 120, whereof only a Mobility Management Entity, MME 123 and a Mobile Location Center, MLC 124 are depicted in FIG. 1. The cellular network 120 further comprises an MDT Server 125. The wireless local network 140 comprises at least one Access Point, AP 142, which may e.g. be a WLAN access point provides a connection to the internet for the communication device 110 or a user equipment. Normally there are tens of satellites in a GPS system, and at least 4 are visible for a communication device to be able to compute its position. In FIG. 1, only one satellite 132 is depicted in the satellite positioning system 130. The satellite positioning system 130 may e.g. be a GPS, a GLONASS or Galileo Position System.

Figure 2:
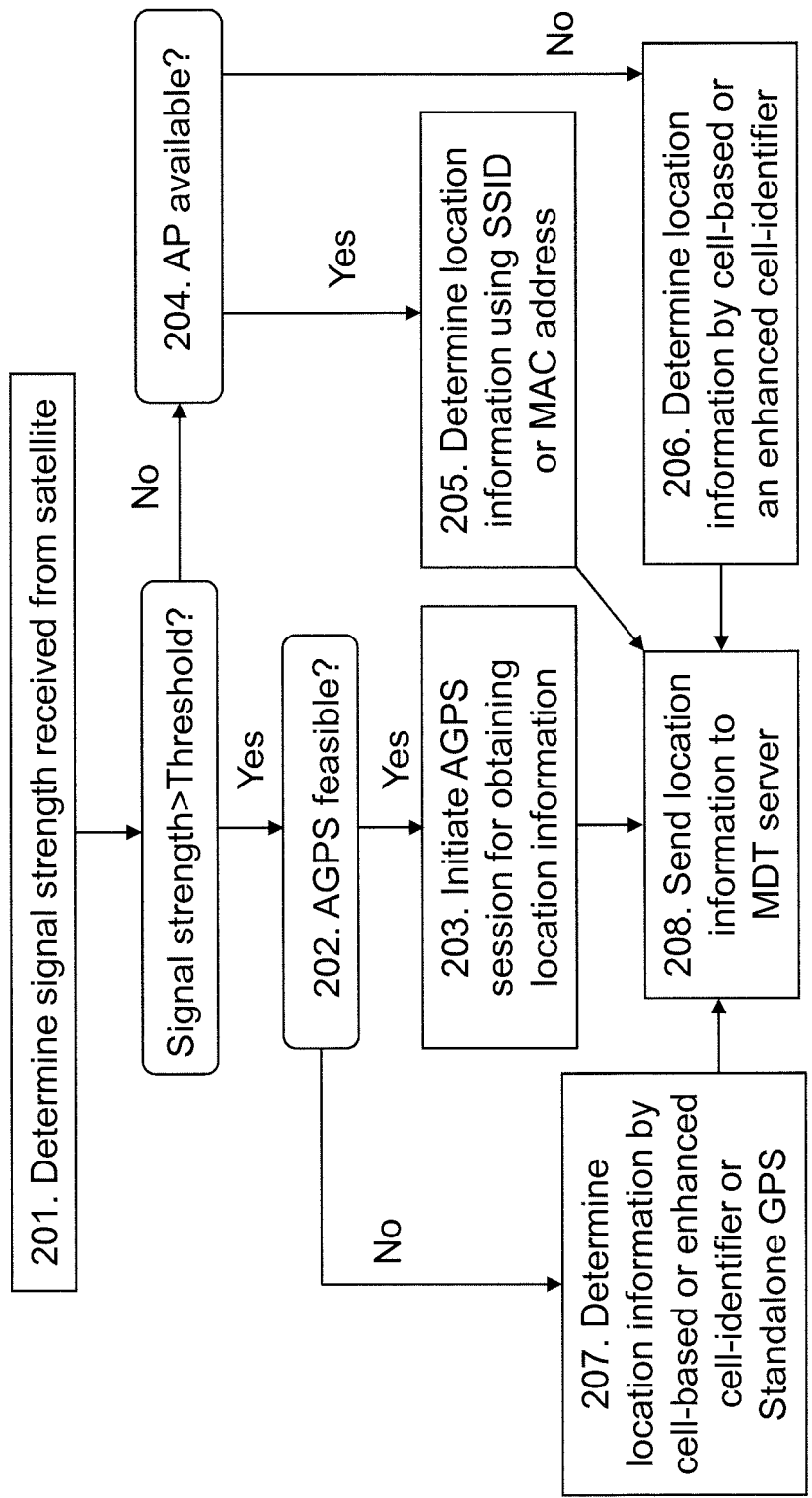
FIG. 2 is a flowchart depicting one embodiment of a method in a communication device.

Example of embodiments of a method in the communication device 110 for providing a location information of the communication device 110 to the MDT server 125 will now be described with reference to FIG. 2. As mentioned above, the communication device 110 operates in the wireless communication environment 100 and the wireless communications environment 100 comprises at least a cellular network 120, a satellite positioning system 130 and a wireless local network 140. The method comprises the following actions, which actions may be taken in any suitable order.

Action 201

When an MDT measurement is started or triggered, i.e. the MDT procedure in the communication device 110 will e.g. be activated by the cellular network 120 to perform measurements. The MDT measurement may be started periodically or triggered by an event. The event may typically be when a received radio signal quality of a serving cell is worse than a pre-defined threshold.

In order to select the best option to obtain the local information of the communication device 110, a signal strength received from the satellite 132 in the satellite positioning system 130 is measured at a positioning antenna. This is an advantage since it is done without involving or power on modules and functions in a stand-alone GPS unit comprised in the communication device 110.

Action 202

When the signal strength received from the satellite 132 is above a threshold, the communication device 110 determines whether or not the communication device 110 supports AGPS, i.e. a feasibility of an AGPS. This is to check if the communication device 110 and the cellular network support the AGPS function.

Action 203

When the AGPS is feasible, i.e. the communication device 110 and the cellular network support the AGPS, the communication device 110 initiates an AGPS session for obtaining the location information using an acquisition assistance data.

Action 204

Following Action 201, when the signal strength received from the satellite 132 is below a threshold, the communication device 110 determines whether an access point 142 in the wireless local network 140 is available. If the GPS signals are too weak for positioning calculations due to various causes including multipath and signal blockage indoors, e.g. the communication device 110 is indoor, the communication device 110 will check if there is an access point with a good signal strength, i.e. the signal strength is above a threshold.

Action 205

When the access point AP 142 is available, the communication device 110 determines the location information using Service Set Identifier, SSID, or Media Access Control, MAC, address of an access point 142 serving the communication device 100 in the wireless local network 140. When the signal strength of the access point AP 142 is above a threshold, the communication device 110 is within a coverage or serving range of the AP 142, and is able to read the beacons of the AP 142. Then the communication device 110 may use WiFi or WLAN positioning if it is available. The WiFi or WLAN positioning is a specific program in a communication device to calculate positions of the communication device. The WiFi or WLAN positioning may be very accurate, yet may be totally wrong with the computed positions. Thus SSID or MAC address of the AP 142 which have position information is used to determine the location information of the communication device 110. Using SSID or MAC address not only has an advantage of providing valuable location information when the WiFi or WLAN positioning is not available in the communication device 110, but also has an advantage of checking the reliability of the computed positions by the WiFi or WLAN positioning when the WiFi or WLAN positioning is available.

Action 206

Following Actions 201 and 204, when the signal strength from the satellite 132 is too weak and the access point 142 is not available, the communication device 110 determines the location information by a cell-based or an enhanced cell-identifier method based on the cellular network 120. That means the communication device 110 is out of the coverages of both the satellite positioning system 130 and the wireless local network 140. The communication device 110 then will fall back to cell-based solutions or an enhanced cell-identifier method based on the cellular network 120 to obtain the location information.

The cell-based solutions or enhanced cell-identifier method based on the cellular network 120 may comprise the following actions:

Action 206a

The communication device 110 determines a position of an access node in the cellular network 120 from a cell data.

Action 206b

The communication device 110 measures a travel time of a signal transmitted from the access node to the communication device 110.

Action 206c

The communication device 110 calculates the location information from the measured travel time.

Action 207

Following Actions 202, when the AGPS is not feasible, the communication device 110 determines the location information by a cell-based or an enhanced cell-identifier method based on the cellular network 120, or by a standalone positioning method based on the satellite positioning system (130). That means if the AGPS is not supported, e.g. unavailable in the cellular network 120 or the communication device 110, the communication device 110 may fall back to cell-based solutions such as OTDOA (Observed Time Difference Of Arrival) or enhanced cell-ID with time advance, which are less accurate yet still providing location information to a considerable degree. If the AGPS are not supported but the GPS signals are good, the communication device 110 may use the standalone GPS unit to obtain the location information.

Action 208

After the location information is obtained from different methods as discussed above in the different Actions 203, 205, 206, 207, the communication device 110 sends the location information together with other MDT data to the MDT server 125. The communication device 110 may send the location information and other measurements immediately to the cellular network 120 as part of a Radio Resource Management (RRM) procedure, or may log them in a memory in the communication device 110 and report to the cellular network 120 when requested by the cellular network 120.

Following action 203, i.e. the communication device 110 initiates an AGPS session for obtaining the location information by using an acquisition assistance data, the AGPS session may be implemented in two ways, i.e. the AGPS has two modes of operation. One mode is called Mobile Station Assisted (MSA) AGPS. In MSA AGPS, calculation of position is done by a server in a cellular network using information from a GPS receiver in the mobile station or in a communication device.

Another mode is called Mobile Station Based (MSB) AGPS. In MSB AGPS, the mobile station or the communication device calculates the location information by using data from servers for AGPS in the network. These AGPS servers download orbital information from the satellite and store it in a database. An AGPS capable device can connect to these servers and download this information using mobile network radio bearers such as GSM, CDMA, WCDMA, LTE or even using other wireless radio bearers such as Wi-Fi. Usually the data rate of these bearers is high, hence downloading the orbital information takes less time and enabling the GPS receiver to lock to the satellites more rapidly.

According to some embodiments, the communication device 110 uses MSA AGPS, the following actions are performed:

Action 301

The communication device 110 sends a location request to an access node 122 in the cellular network 120.

Action 302

The communication device 110 receives an acquisition assistance data from Mobile Location Centers, MLC 124 via the access node 122. To take full advantage of the MSA AGPS, the cellular network 120 must deliver an Acquisition Assistance data. The Acquisition Assistance data consists of data that informs the communication device 110 exactly where to search for satellites in a Doppler/Code-phase space. Each satellite has a unique code called a Pseudo Random Code and the satellites repeat this code each millisecond. The GPS receivers in the communication device 110 generate the same codes and compare them to the incoming codes.

Action 303

The communication device 110 calculates pseudo ranges to one or more satellites using the acquisition assistance data. This is done by the GPS receiver in the communication device 110 which compares the codes and calculates a delay experienced in the codes, then multiplies the delay with a speed of light to obtain a pseudo range to a satellite.

Action 304

The communication device 110 sends the calculated pseudo ranges to the MLC 124 via the access node 122. In MSA AGPS, majority functions of the traditional GPS receiver are shifted to a sever for AGPS in a network, such as a Serving Mobile Positioning Center (SMPC) or an MLC in the cellular network 120. After receiving the pseudo range data from the communication device 110, the MLC 124 calculates the position, i.e. location information of the communication device 110 and sends the calculated location information to the communication device 110.

Action 305

The communication device 110 receives calculated location information from the MLC 124 via the access node 122.

According to some embodiments, the communication device 110 uses MSB AGPS, the following actions are performed, where Actions 401-403 are same as above Actions 301-303:

Action 401

The communication device 110 sends a location request to an access node 122 in the cellular network 120.

Action 402

The communication device 110 receives an acquisition assistance data from Mobile Location Centers, MLC 124 via the access node 122.

Action 403

The communication device 110 calculates pseudo ranges to one or more satellites using the acquisition assistance data.

Action 404

When the communication device 110 has information about the pseudo ranges, it measures arrival times of signals from the one or more satellites based on the pseudo ranges.

Action 405

The communication device calculates the location information based on the arrival times.

Figures 3, 4:
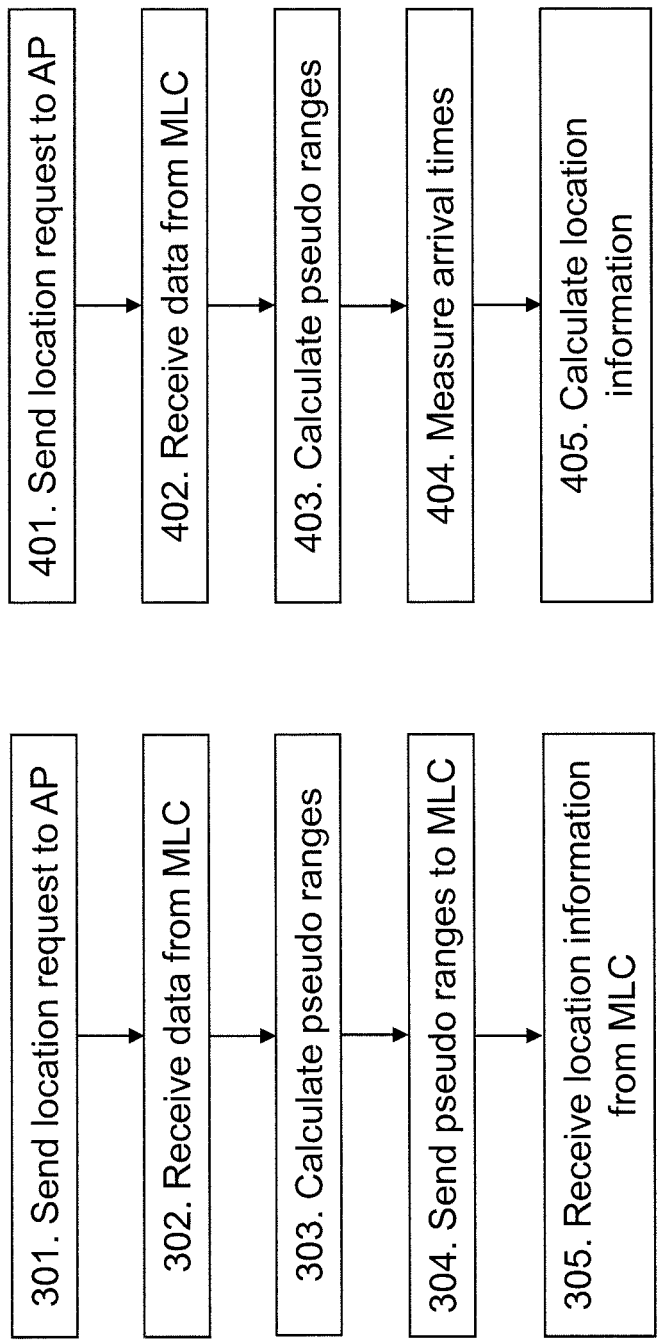
FIG. 3 is a flowchart depicting one embodiment of a method in a communication device.
FIG. 4 is a flowchart depicting one embodiment of a method in a communication device.
Figure 5:
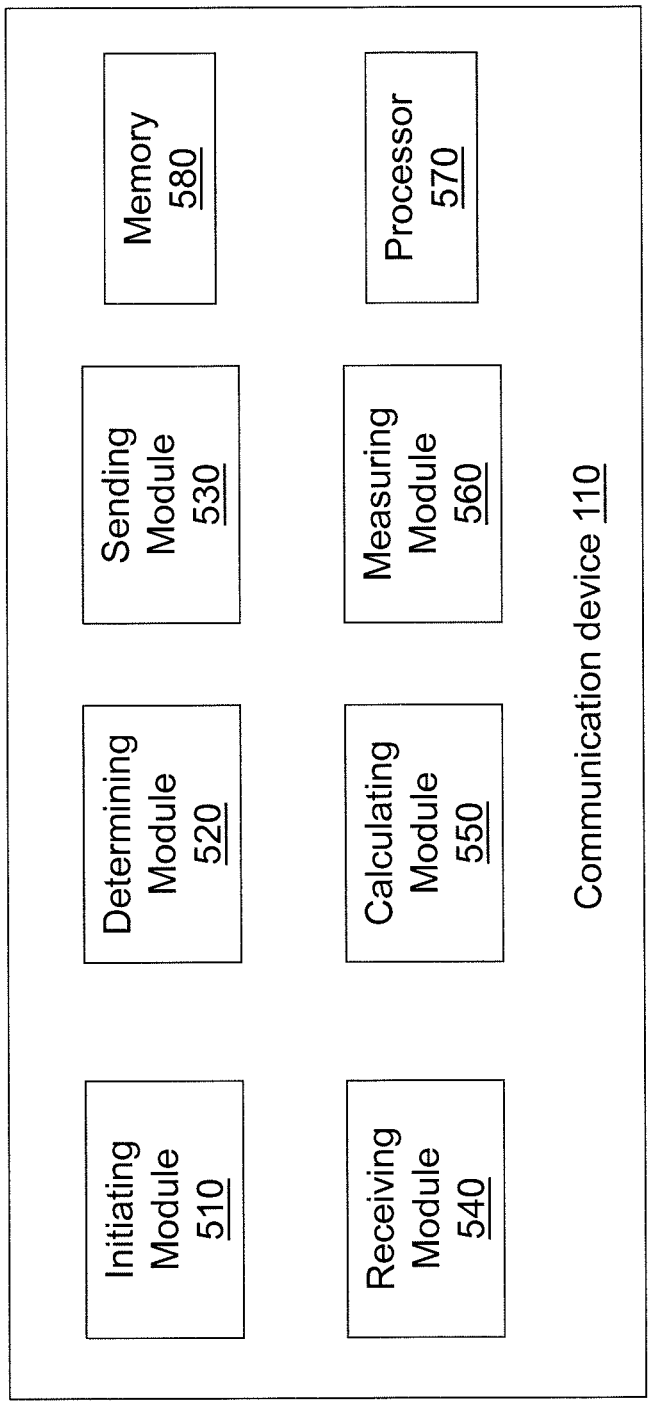
FIG. 5 is a schematic block diagram illustrating embodiments of a communication device.

To perform the method actions in the communication device 110 for providing a location information of the communication device 110 to a Minimization of Driving Tests, MDT server 125, described above in relation to FIGS. 2-4, the communication device 110 comprises the following circuits or modules depicted in FIG. 5. As mentioned above, the communication device 110 operates in the wireless communication environment 100 and the wireless communications environment 100 comprises at least a cellular network 120, a satellite positioning system 130 and a wireless local network 140.

The communication device 110 is configured to, e.g. by means of an initiating module 510, start an MDT measurement. The communication device 110 is further configured to, e.g. by means of a determining module 520, determine a signal strength received from a satellite 132 in a satellite positioning system 130 by measuring the signal strength at a positioning antenna. When the signal strength received from the satellite 132 is above a threshold, the communication device 110 is further configured to, by means of the determining module 510, determine a feasibility of an Assisted Global Position System, AGPS. When the AGPS is feasible, the communication device 110 is configured to, by means of the initiating module 510, initiate an AGPS session for obtaining the location information. The communication device 110 is further configured to, e.g. by means of a sending module 530, send the location information together with other MDT data to the MDT server 125.

In some embodiments, when the signal strength received from the satellite 132 is below a threshold, the communication device 110 is further configured to, by means of the determining module 520, determine whether an access point 142 in the wireless local network 140 is available. When the access point 142 is available, the communication device 110 determines the location information using Service Set Identifier, SSID, or Media Access Control, MAC, address of an access point 142 serving the communication device 110 in the wireless local network 140. When the access point (142) is not available, the communication device 110 determines the location information by a cell-based or an enhanced cell-identifier method based on the cellular network 120.

In some embodiments, when the AGPS is not feasible, the communication device 110 is further configured to, by means of the determining module 520, determine the location information by a cell-based or an enhanced cell-identifier method based on the cellular network 120, or by a standalone positioning method based on the satellite positioning system 130.

In some embodiments, when an AGPS session is initiated in the communication device 110 for obtaining the location information by using an acquisition assistance data, the communication device 110 is further configured, by means of the sending module 530, send a location request to an access node 122 in the cellular network 120. The communication device 110 is further configured, by means of a receiving module 540, receive the acquisition assistance data from Mobile Location Centers, MLC 124, via the access node 122. Then the communication device 110 is configured to, by means of a calculating module 550, calculate pseudo ranges to one or more satellites using the acquisition assistance data. The communication device 110 is further configured, by means of the sending module 530, send the calculated pseudo ranges to the MLC 124 via the access node 122 and receive calculated location information from the MLC, via the access node 122, by means of the receiving module 540.

In some embodiments, when an AGPS session is initiated in the communication device 110 for obtaining the location information by using an acquisition assistance data, the communication device 110 is further configured, by means of the sending module 530, send a location request to an access node 122 in the cellular network 120. The communication device 110 is further configured, by means of the receiving module 540, receive the acquisition assistance data from Mobile Location Centers, MLC 124, via the access node 122. Then the communication device 110 is configured to, by means of the calculating module 550, calculate pseudo ranges to one or more satellites using the acquisition assistance data. The communication device 110 is further configured, by means of a measuring module 560, measure arrival times of signals from the one or more satellites based on the pseudo ranges and calculate the location information based on the arrival times, by means of the calculating module 550.

Those skilled in the art will appreciate that the initiating module 510, determining module 520, sending module 530, receiving module 540, calculating module 550 and measuring module 560 described above may be referred to one module, a combination of analog and digital circuits, one or more processors, such as processor 570, depicted in FIG. 5, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The communication device 110 may further comprise a memory 580 comprising one or more memory units. The memory 580 is arranged to be used to store obtained location information, other measurements and data, as well as configurations to perform the methods herein when being executed in the communication device 110.

The embodiments herein in the communication device 110 for providing a location information of the communication device 110 to a Minimization of Driving Tests, MDT server 125 may be implemented through one or more processors, such as the processor 570 in the communication device 110, together with computer program code for performing the functions and actions of the embodiments herein. The program code mentioned above may also be provided as a computer program product, for instance in the form of a data carrier carrying computer program code for performing the embodiments herein when being loaded into the communication device 110. One such carrier may be in the form of a CD ROM disc. It is however feasible with other data carriers such as a memory stick. The computer program code may furthermore be provided as pure program code on a server and downloaded to the communication device 110.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a communication device operating in a wireless communication environment, the method comprising:
   in response to a Minimization of Driving Tests (MDT) measurement being started, determining a signal strength received from a satellite in a satellite positioning system by measuring the signal strength at a positioning antenna of the communication device without using a Global Position System (GPS) receiver of the communication device;
   when the signal strength received from the satellite is above a threshold, determining a feasibility of an Assisted Global Position System (AGPS) session;
   in response to a determination that an AGPS session is feasible, initiating an AGPS session for determining location information of the communication device; and
   sending the location information to an MDT server.

2. The method according to claim 1, wherein initiating an AGPS session comprises:
   sending a location request to an access node in a cellular network;
   receiving acquisition assistance data from a Mobile Location Center (MLC), via the access node;
   calculating pseudo ranges to one or more satellites using the acquisition assistance data;
   sending the calculated pseudo ranges to the MLC via the access node; and
   receiving calculated location information from the MLC, via the access node.

3. The method according to claim 1, wherein initiating an AGPS session comprises:
   sending a location request to an access node in a cellular network;
   receiving acquisition assistance data from a Mobile Location Center (MLC), via the access node;
   calculating pseudo ranges to one or more satellites using the acquisition assistance data;
   measuring arrival times of signals from the one or more satellites based on the pseudo ranges; and
   calculating the location information based on the arrival times.

4. The method according to claim 1, wherein the method further comprises:
   when the signal strength received from the satellite is below a threshold, determining whether an access point in a wireless local network is available;
   when the access point is available, determining location information using at least one of a Service Set Identifier (SSID) or a Media Access Control (MAC) address of an access point serving the communication device in the wireless local network; and
   when the access point is not available, determining the location information by at least one of a cell-based or an enhanced cell-identifier method based on a cellular network.

5. The method according to claim 4, wherein determining the location information by at least one of a cell-based or an enhanced cell-identifier method based on the cellular network comprises:
   determining a position of an access node in the cellular network from cell data;
   measuring a travel time of a signal transmitted from the access node to the communication device; and
   calculating the location information from the measured travel time.

6. The method according to claim 1, further comprising:
   when an AGPS session is not available, determining location information by at least one of:
     a cell-based or an enhanced cell-identifier method based on a cellular network, or
     a standalone positioning method based on the satellite positioning system.

7. The method according to claim 1, wherein the satellite positioning system comprises one of Global Positioning System (GPS), Global Navigation Satellite System (GLONASS), or Galileo Position System.

8. The method according to claim 1, wherein the MDT measurement is started by one of a periodic trigger or an event trigger.

9. A communication device operating in a wireless communication environment, the communication device comprising:

a positioning antenna;
a Global Position System (GPS) receiver; and
a processor configured to:
- in response to a Minimization of Driving Tests (MDT) measurement being started, determine a signal strength received from a satellite in a satellite positioning system by measuring the signal strength at the positioning antenna without using the GPS receiver;
- when the signal strength received from the satellite is above a threshold, determine a feasibility of an Assisted Global Position System (AGPS) session;
- when an AGPS session is feasible, initiate an AGPS session and determine location information of the communication device; and
- send the location information to an MDT server.

10. The communication device according to claim 9, wherein the communication device is further configured to:
- send a location request to an access node in a cellular network;
- receive an acquisition assistance data from a Mobile Location Center (MLC), via the access node;
- calculate pseudo ranges to one or more satellites using the acquisition assistance data;
- send the calculated pseudo ranges to the MLC via the access node; and
- receive calculated location information from the MLC, via the access node.

11. The communication device according to claim 9, wherein the communication device is further configured to:
- send a location request to an access node in a cellular network;
- receive an acquisition assistance data from a Mobile Location Center (MLC), via the access node;
- calculate pseudo ranges to one or more satellites using the acquisition assistance data;
- measure arrival times of signals from the one or more satellites based on the pseudo ranges; and
- calculate the location information based on the arrival times.

12. The communication device according to claim 9, wherein the communication device is further configured to:
- when the signal strength received from the satellite is below a threshold, determine whether an access point in the wireless local network is available;
- when the access point is available, determine the location information using at least one of Service Set Identifier (SSID), or Media Access Control (MAC) address of the access point;
- when the access point is not available, determine the location information by one of a cell-based or an enhanced cell-identifier method based on the cellular network.

13. The communication device according to claim 9, wherein the communication device is further configured to:
- when the AGPS session is not available, determine the location information by at least one of:
  - a cell-based or an enhanced cell-identifier method based on a cellular network, or
  - a standalone positioning method based on the satellite positioning system.

14. The communication device according to claim 9, wherein the satellite positioning system comprises one of Global Positioning System (GPS), Global Navigation Satellite System (GLONASS), or Galileo Position System.

15. The communication device according to claim 9, wherein the MDT measurement is started by one of a periodic trigger or an event trigger.

* * * * *